OSCILLATOR AND FREQUENCY DIVIDER ASSEMBLY

Filed Dec. 12, 1960

INVENTOR.
Daniel J. Tomcik
BY
Stone, Nierman, Burmeister & Zummer
Attorneys 3,246,255
Patented Apr. 12, 1966

3,246,255

OSCILLATOR AND FREQUENCY DIVIDER ASSEMBLY

Daniel J. Tomcik, Buchanan, Mich., assignor to Electro-Voice, Incorporated, Buchanan, Mich., a corporation of Indiana Filed Dec. 12, 1960, Ser. No. 75,270
6 Claims. (Cl. 331—51)

Figures 1, 2:
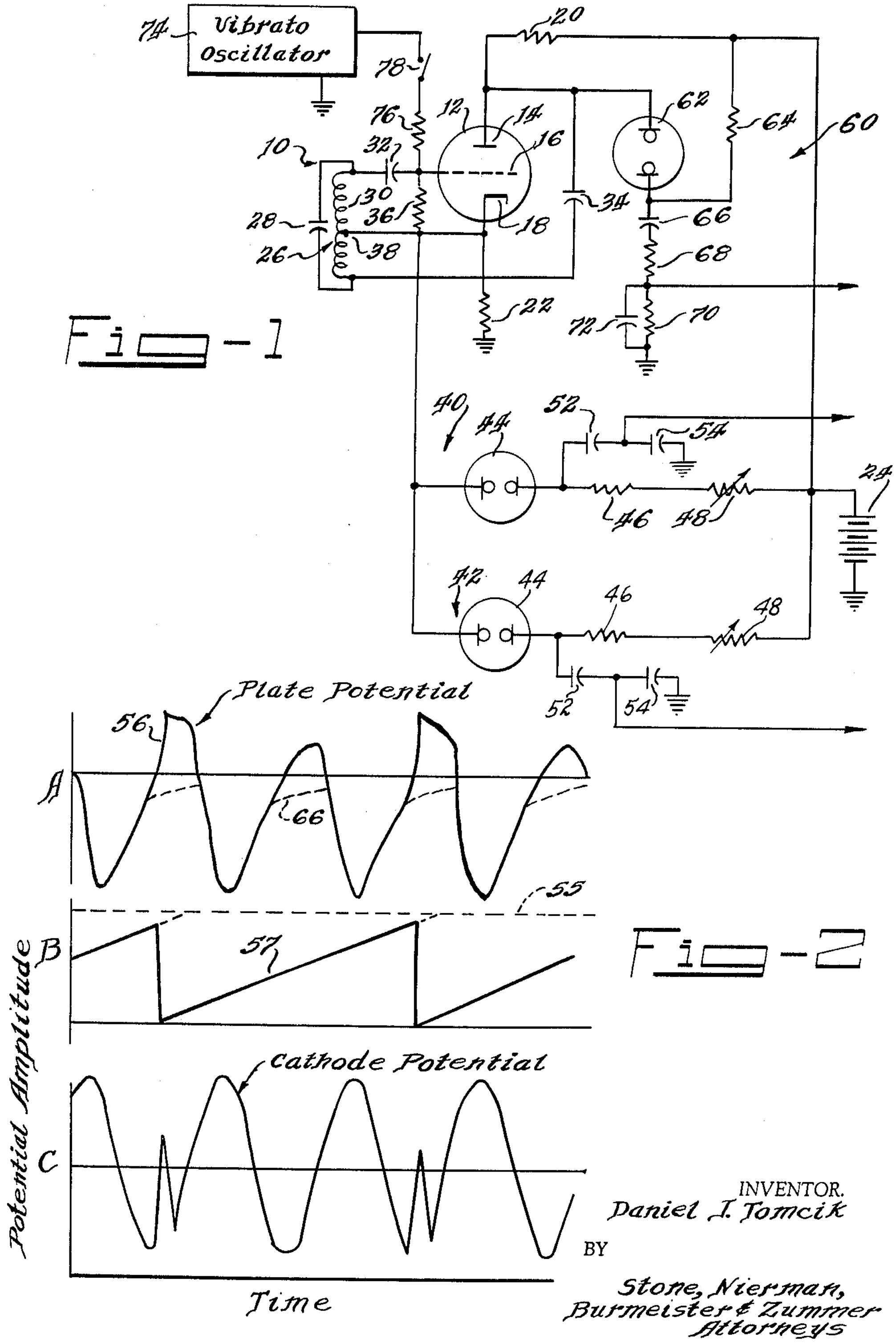

The present invention relates broadly to devices for generating a plurality of harmonically related electrical waves, and particularly to such devices for generating harmonically related periodic electrical waves of high harmonic content. This invention has particular importance in electrical musical instruments, although its utility is not confined to electrical musical instruments.

Many electrical musical instruments, particularly electrical organs, employ a master oscillator to generate a fundamental frequency, and frequency divider circuits coupled to the master oscillator to generate electrical signals which are sub-multiples of the fundamental frequency. It is conventional to employ a master oscillator having a fundamental frequency in the highest octave which is to be employed, and utilize a chain of cascade connected dividers to generate the sub-multiples of this frequency for the same note in each of the lower octaves. It has also been conventional to employ relaxation oscillators, and particularly to utilize two element gaseous discharge tubes in such relaxation oscillators. Patent No. 2,680,198 which issued to John D. Bick discloses a master oscillator coupled to a chain of cascade connected frequency dividers for use in an electrical musical instrument of this type.

A relaxation oscillator of the type employing gaseous discharge tubes utilizes a series electrical circuit with the gaseous discharge tube, an impedence element, and a direct current source. A capacitor is connected in parallel with the impedence element. Such relaxation oscillators are "free running" and have a frequency which is determined by the time constant of the capacitor and impedence element. In musical instruments of the type referred to above, such relaxation oscillators are selected to have a free running resonant frequency slightly below a sub-multiple of the frequency of the master oscillator, so that energy from the master oscillator may be used to trigger the gaseous discharge tube of the relaxation oscillator prior to the time it would normally be triggered by its own time constants, thereby locking the frequency of the relaxation oscillator to that of the master oscillator. In the patent to Bick, for example, the master oscillator has a high impedence output which is coupled in parallel with the first frequency divider, and the output of the first frequency divider is also a high impedence output, and it is also coupled in parallel with the following frequency divider. When a plurality of gaseous discharge tube relaxation oscillators are connected in cascade, the firing of the gaseous discharge tube of one of the relaxation oscillators will feed back a pulse to the preceding relaxation oscillator, and this pulse will affect the harmonic content of the preceding relaxation oscillator by introducing sub-multiple frequencies of its normal fundamental frequency. For this reason, it has been necessary to provide a coupling network between subsequent relaxation oscillators or a non-linear element which may take the form of a second gaseous discharge tube, as has been done in the Bick patent.

It is one of the objects of the present invention to provide a highly stable oscillator and frequency divider which utilizes relaxation oscillators and which eliminates the need for coupling devices between stages. The present invention achieves this object by providing a master oscillator and relaxation oscillator assembly in which the relaxation oscillators are coupled in series with a low impedance element of the master oscillator.

Tone coloration resulting from feedback between relaxation oscillators in a divider chain is thus eliminated in a master oscillator and divider assembly constructed according to the present invention. Further, a master oscillator and frequency divider assembly constructed according to the present invention utilizes less components than those of the prior art and thus is less costly in construction. Each of the relaxation oscillator dividers is independent from all other dividers except for the common connection with the low impedance output of the master oscillator. As a result, faulty operation of one divider does not affect operation of other dividers. This fact enables faulty operation to be quickly observed and readily corrected.

It is also an object of the present invention to provide an improved combination master oscillator, frequency modulator, and frequency divider assembly which is suitable for use in electrical musical instruments and which provides a vibrato effect to the instrument. In particular, it is desired to provide such an assembly using gaseous discharge tube relaxation oscillators in which the magnitude of the frequency deviation achieved may exceed that achievable with gaseous tube relaxation oscillator dividers known heretofore. As explained above, the frequency instability of gaseous discharge tube dividers has made it difficult to provide vibrato since some of the dividers tended to become free running. Musical instruments of this type prior to the present invention either had to employ added circuits for frequency stabilization or use tremulo in place of vibrato. Some musical instruments of this type prior to the present invention also added vibrato in circuits other than the master oscillators.

These and additional objects of the present invention will become more clearly apparent upon a further consideration of the present disclosure, particularly when viewed in the light of the drawing in which:

FIGURE 1 is a schematic electrical circuit diagram illustrating a master oscillator, frequency divider, frequency modulator assembly constructed according to the teachings of the present invention; and FIGURES 2(A), 2(B) and 2(C) are schematic diagrams illustrating the voltage wave forms which are referred to in the description of the operation of the assembly illustrated in FIGURE 1.

The master oscillator 10 is a modified Hartley oscillator, although this oscillator could also employ other types of oscillator circuits, such as the Colpitts circuit. The oscillator 10 employs a triode vacuum tube 12 with a plate 14, grid 16 and an electron emitter electrode, or electron return electrode, in the form of a cathode 18. The plate 14 is connected to the cathode 18 through a plate circuit which employs a plate resistor 20 connected to the plate 14, a cathode resistor 22 connected to the cathode 18 and a direct current power source 24 in the form of a battery which has its positive terminal connected to the resistor 20 and its negative terminal connected to the cathode resistor 22.

The grid 16 of the vacuum tube 12 is connected to a tank circuit 26 which includes a capacitor 28 and an inductor 30 connected in parallel. A capacitor 32 is connected between the grid 16 and the tank circuit 26, and a second capacitor 34 is connected between the end of the tank circuit 26 opposite the grid 16 and the plate 14. A grid resistor 36 is connected between the grid 16 and the cathode 18, and the cathode 18 is also connected to a tap 38 on the inductor 30.

FIGURE 1 illustrates two frequency dividers 40 and 42, although it is to be understood that more or fewer frequency dividers may be employed. Each of the frequency dividers 40 and 42 employs a gaseous discharge tube 44 having two electrodes connected in series with two resistors 46 and 48. The power source 24 and cathode resistor 22 are also connected in a series circuit with each tube 44 and resistors 46 and 48, and each relaxation oscillator has capacitors 52 and 54 connected in series and in parallel with the serially connected resistors 46, 48, and the power source 24. The output from the frequency divider 42 is taken from the junction of the capacitors 52 and 54.

The relaxation oscillators or dividers 40 and 42 have free running frequencies which are determined by the resistors 46 and 48 and capacitors 52 and 54, and also by the power source 24. The power source 24 charges the capacitors 52 and 54 of each divider through the resistors 46 and 48, and when the potential applied across the gaseous discharge tubes 44 of that divider is sufficient in magnitude for the tube to fire, the tube fires resulting in the potential at the junction of capacitors 52 and 54 experiencing a sharp negative pulse. This free running frequency is selected to be slightly lower than the desired frequency of operation of the frequency divider. Assuming frequency divider 40 to be operating at one-half the frequency of the master oscillator 10, the free running frequency of this divider would be selected slightly below half the frequency of the master oscillator, and the negative portion of the sinusoidal wave produced across the cathode resistor 22 of the oscillator 10 is added to the potential applied to the gaseous discharge tube 44 to accelerate the time of firing of this tube and to synchronize the frequency of the relaxation oscillator or divider 40 to that of the master oscillator 10. FIGURE 2 shows the plate potential of vacuum tube 12 in curve (A). If the divider 42 is to be operating at one-fourth the frequency of the master oscillator 10, its free running frequency will be selected slightly below one-fourth that of the master oscillator and operation will be similar to that described above. In curve 2(B) the ignition potential of the gaseous discharge tube 44 is illustrated by line 55, and the charging potential across capacitors 52 and 54 is illustrated at 57.

Because of the fact that the cathode resistor 22 of the master oscillator 10 is also in series with each of the frequency dividers 40 and 42, the current pulses produced in each frequency divider by the firing of the gaseous discharge tube thereof are also impressed upon the oscillator 10 and appear in the positive portion of the plate potential curve of the oscillator. Curve (A) of FIGURE 2 illustrates this pulse 56 on every other positive portion of the potential wave. These pulses 56 are produced by the frequency divider 40, since it is triggered only for every other positive portion of the wave form of the plate 14. Curve 2(C) illustrates the cathode potential wave form.

In order to obtain a fundamental frequency output from the master oscillator frequency divider assembly, the pulses 56 must be removed. This may be accomplished either by operating the frequency divider 40 at the fundamental frequency of the master oscillator, or by shaping the pulses produced by the master oscillator itself. For this reason, a clipper and shaping circuit 60 is illustrated in FIGURE 1.

The clipper portion of the circuit 60 employs a gaseous discharge tube 62 and resistor 64 connected in series, and the series combination of these elements is connected in parallel with the plate resistor 20. As a result, the gaseous discharge tube 62 is subjected to the alternating current component of the potential developed across the plate resistor 20. The gaseous discharge tube 62 thus fires for each negative portion of the alternating current potential on the plate of vacuum tube 12. This action by the gaseous discharge tube 62 therefore permits the negative portion of the plate wave form to pass on to the output circuit while it is ionized and prevents the positive portions of the plate voltage cycle from occurring at the output during its period of non-ionization. As a result, the positive portions of the potential waves are clipped, as shown by the dotted line 66 in FIGURE 2(A). Further, the potential appearing at the junction of gaseous discharge tube 62 and resistor 64 has a magnitude equal to that of the positive potential of the battery power source 24 less the extinction potential of the tube 62 except during periods in which the gaseous discharge tube 62 is fired, and during these periods this potential drops substantially to rise in a modified saw-toothed fashion. Since the frequency of these modified saw-toothed waves produced at this junction of the gaseous discharge tube 62 and resistor 64 is that of the master oscillator, these waves form a desirable output which is rich in harmonics.

The output waves from the junction of the gaseous discharge tube 62 and resistor 64 are shaped as a result of a capacitor 66 and a pair of resistors 68 and 70 connected in series between this junction and the negative terminal of the power source 24. A capacitor 72 is also connected in parallel with the resistor 70 in order to improve the harmonic content of the output which is taken across resistor 70. Resistors 68 and 70 therefore provide a divider for establishing the proper output level. The harmonic content of the output is also improved by the capacitor 66 which differentiates the electrical waves appearing at the junction of the gaseous discharge tube 62 and resistor 64.

Sinusoidal waves, such as those which are produced by the oscillator 10, have been shaped by devices previously known to improve their harmonic content, Patent No. 2,506,723, to Larsen showing a gaseous discharge tube shaper coupled across the output of a sine wave oscillator. In the present invention, however, the gaseous discharge tube 62 is connected in parallel with the plate resistor 20 through resistor 64, and the output wave of the oscillator is utilized to generate an essentially independently controlled saw-tooth wave. As a result, the output of the shaper is substantially independent of the wave form of the master oscillator 10, except for frequency.

The capacitors 52 and 54 also serve to adjust the level of output from the relaxation oscillator dividers 40 and 42. Also, capacitor 54 should be substantially larger than capacitor 52 in order to reduce any effect that a load might produce on the frequency of the relaxation oscillators 40 and 42.

FIGURE 1 also illustrates a frequency modulating means, which comprises the oscillator 74, which is connected to the grid 16 of vacuum tube 10 through a resistor 76 and a switch 78. If it is desired to produce a vibrato effect, the switch 78 is closed impressing sinusiodially alternating voltage on the grid 16 of the tube 12 to frequency modulate the oscillator at the frequency of the vibrato oscillator 74. The frequency of vibrato generally employed is very low, for example, 6 cycles per second.

It has, of course, been known that a vibrato may be achieved by frequency modulating the master oscillator of a musical instrument, as is shown by the Larsen patent. However, a musical instrument constructed according to the present invention achieves this vibrato effect in a simplified and less costly manner because of the stability of the divider circuits which make possible greater frequency deviations without requiring additional circuits to maintain synchronization of the dividers and master oscillators.

In one particular construction of a master oscillator and frequency divider assembly of the type described herein, the physical components have the following characteristics:

| Element: | Magnitude |
|---|---|
| Vacuum tube 12 | (1) |
| Gaseous discharge tubes 44 and 62 | (2) |
| Resistor 20, ohms | 100,000 |
| Resistor 22, ohms | 15,000 |
| Resistor 46, megohms | 1.2 |
| Resistor 48, megohm, variable | 5 |

| Element: | Magnitude |
|---|---|
| Capacitor **52**, microfarads | 0.01 |
| Capacitor **54**, microfarads | 0.022 |
| Capacitor **66**, microfarads | 0.001 |
| Resistor **68**, ohms | 100,000 |
| Resistor **70**, ohms | 22,000 |
| Capacitor **72**, microfarads | 0.002 |
| Resistor **64**, ohms | 220,000 |
| Capacitor **32**, microfarads | 0.047 |
| Capacitor **34**, microfarads | 0.01 |
| Power Source **24**, volts | 250 |

[1] Type 12AX7 (1 section thereof).
[2] Neon lamps, type NE–2.

It will be recognized that glow discharge tubes 44 and 62 are particularly suitable for use in the present invention since they are inexpensive, readily available and reliable. Glow discharge tubes are, however, only one type of electron valve which may be used in a relaxation oscillator. As here used, the term "electron valve" is intended to mean any device which controls the flow of electrical charges and includes, among other devices, vacuum tubes, gas tubes and transistors. Suitable electron valves for relaxation oscillators have a conduction threshold, or "firing" potential, which occurs at a higher potential than the threshold at which conduction falls substantially, or extinguishing threshold. The relaxation oscillators here disclosed, as well as well known transistor relaxation oscillators, employs a capacitor (capacitors 52 and 54) and a capacitor charging circuit connected to the capacitor (resistors 46 and 48).

The foregoing embodiment of the present invention has been specifically described, but it is to be understood that it is only one example of the manner in which the present invention may be practiced. For example, the present invention should not be construed as limited to the specific oscillator circuit described, since other oscillator circuits which may be provided with low impedance outputs may also be employed. Further, the present invention should not be limited to the particular relaxation oscillators as set forth above. Hence, it is intended that the scope of the present invention be not limited to this specific disclosure, but rather only by the appended claims.

The invention claimed is:

1. A source of periodic electrical waves of high harmonic content comprising a first oscillator having a vacuum tube with a plate, a grid, and an electron return electrode, said oscillator having a grid to return electrode circuit and a plate to return electrode circuit including a first impedance member electrically connected to the electron return electrode, and a direct current power source connected between the first impedance member and the plate of the vacuum tube, the plate to return electrode circuit being electrically coupled to the grid to return electrode circuit to provide a feedback path to produce oscillation, and a second oscillator including, in a closed series circuit, the first impedance member, a capacitor, and a two element gaseous discharge tube having, a higher conduction threshold than extinguishing threshold, said second oscillator having a capacitor charging circuit connected to the capacitor including, in a closed series circuit, the capacitor, a second impedance member, and a direct current power source of potential greater than the conduction threshold of the gaseous discharge tube, said second oscillator being adapted to oscillate at a frequency slightly lower than a sub-harmonic of the first oscillator when the first oscillator is inoperative and said second oscillator oscillating at a sub-harmonic frequency of the first oscillator when the first oscillator is operating.

2. A source of a plurality of harmonically related electrical waves of high harmonic content comprising, in combination: a first oscillator having a vacuum tube with a plate, a grid and an electron return electrode, said oscillator having a plate to return electrode circuit including, in series, a first impedance member electrically connected to the plate, a second impedance member electrically connected to the electron return electrode of the vacuum tube, and a direct current power source electrically connected between the first impedance member and the second impedance member, the first impedance member having an impedance substantially greater than the second impedance member, said first oscillator having a grid to return electrode circuit electrically coupled to the plate to return electrode circuit to produce electrical oscillations and generate an alternating current in the plate circuit thereof at a fundamental frequency, thereby producing alternating potential drops across the first impedance member and the second impedance member; a clipper circuit including a two element gaseous discharge tube having a higher conduction threshold than extinguishing threshold and a third impedance member connected in series between a first and a second terminal, said first terminal being electrically connected to the plate of the vacuum tube and the second terminal being electrically connected to the junction between the direct current power source and the first impedance member, the conduction threshold of the gaseous discharge tube being lower than the maximum value of the direct current potential drop produced across the first impedance member, whereby the gaseous discharge tube will periodically conduct at the frequency of the first oscillator, and a capacitor and resistor connected in series between a third and a fourth terminal, the third terminal being electrically connected to the junction between the third impedance and the gaseous discharge tube and the fourth terminal being electrically connected to the power source; and a second oscillator including, in a closed series circuit, the second impedance member, a second two-element gaseous discharge tube having a higher conduction threshold than extinguishing threshold, and a second capacitor, and a capacitor charging circuit connected in a closed series circuit including the second capacitor, a direct current power source having a potential greater than the conduction threshold of the second gaseous discharge tube and a fourth impedance member, the second oscillator having a resonant frequency which is slightly lower than a sub-multiple of the frequency of the first oscillator in the absence of operation of the first oscillator and a frequency equal to a submultiple of the frequency of the first oscillator when the first oscillator is operating.

3. A source of a plurality of harmonically related electrical waves of high harmonic content comprising the elements of claim 2 in combination with a third oscillator including, in a closed series circuit, the first impedance member, a third two element gaseous discharge tube having a higher conduction threshold than extinguishing threshold, and a third capacitor, and a second capacitor charging circuit connected in series with the third capacitor including a direct current power source, and a fifth impedance member, the second and third oscillators having resonant frequencies on different submultiples of the frequency of the first oscillator.

4. A source of a plurality of harmonically related electrical waves of high harmonic content comprising, in combination: a master oscillator having an output circuit including, in a closed series circuit, a first impedance member, a second impedance member, a first electron valve having a first terminal electrically connected to the first impedance member and a second terminal electrically connected to the second impedance member, and a direct current power source having a first terminal electrically connected to the end of the first impedance member remote from the electron valve and a second terminal electrically connected to the end of the second impedance member remote from the electron valve, the first impedance member being substantially larger in impedance than the second impedance member, said master oscillator generating an alternating electrical current in the output circuit at a fundamental frequency, thus producing an alternating potential drop across the first and second impedance members; a clipper circuit including a second electron valve and a third impedance member connected in series between a first terminal and a second terminal, the first terminal being electrically connected to the junction of the first impedance member and the first electron valve, and the second terminal being electrically connected to the junction of the first impedance members and the direct current power source, said second electron valve having a higher conduction threshold than extinguishing threshold and the conduction threshold thereof being lower than the maximum voltage drop developed across the first impedance member, a first capacitor and a fourth impedance member connected in series between a third terminal and a fourth terminal, the third terminal being electrically connected to the junction of the second electron valve and third impedance member, and the fourth terminal being electrically connected to the direct current power source; and a second oscillator including, in a closed series circuit, the second impedance member, a third electron valve having a higher conduction threshold than extinguishing threshold, and a second capacitor, and a capacitor charging circuit connected in a closed series circuit with said second capacitor including a direct current power source of greater magnitude than the conduction threshold of the third electron valve and a fifth impedance member, said second oscillator having a resonant frequency in the absence of the operation of the first oscillator lower in frequency than a sub-multiple of the frequency of the first oscillator and a resonant frequency equal to a sub-multiple of the first oscillator when the first oscillator is operating.

5. A source of a plurality of harmonically related electrical waves of high harmonic content comprising the combination of claim 4 in combination with a third oscillator including, in a closed series circuit, the second impedance member, a fourth electron valve having a higher conduction threshold than extinguishing threshold, and a third capacitor, and a second capacitor charging circuit connected in a closed series circuit with said third capacitor including a direct current power source of greater potential than the conduction threshold of the fourth electron valve and a sixth impedance member, the second and third oscillators resonating at different subharmonics of the master oscillator.

6. A source of a plurality of harmonically related electrical waves of high harmonic content comprising, in combination: a first oscillator having a vacuum tube with a plate, a grid and a cathode, said oscillator having a plate to cathode circuit including, in series, a first resistor having two terminals, one terminal of the first resistor being electrically connected to the plate, a direct current power source having a positive terminal electrically connected to the other terminal of the first resistor and a negative terminal, and a second resistor of substantially smaller magnitude than the first resistor having two terminals, one terminal of the second resistor being electrically connected to the cathode and the other terminal of the second resistor being electrically connected to the negative terminal of the direct current power source, said first oscillator having a grid to cathode circuit electrically coupled to the plate to cathode circuit to provide regenerative feedback, said first oscillator generating alternating current electrical waves in the plate circuit thereof producing alternating potential drops across the first and second resistors; a clipper comprising a two element gaseous discharge tube having a higher conduction threshold than extinction threshold having a first terminal electrically connected to the plate and a second terminal, a third resistor having two terminals, one terminal of the third resistor being electrically connected to the second terminal of the gaseous discharge tube, and the second terminal of the third resistor being electrically connected to the positive terminal of the power source, and a wave shaper comprising a first capacitor and fourth resistor connected in series between two terminals, one of the terminals of said serially connected first capacitor and fourth resistor being electrically connected to the negative terminal of the direct current power source and the other terminal thereof being electrically connected to the second terminal of the gaseous discharge tube, the conduction threshold of the gaseous discharge tube being less than the maximum alternating current potential developed across the first resistor; and a second oscillator including, in a closed series circuit, the second resistor, a second two element gaseous discharge tube having one terminal electrically connected to the cathode of the vacuum tube and a second terminal, a second capacitor electrically connected between the second terminal of the second gaseous discharge tube and the negative terminal of the power source, the second gaseous discharge tube having higher conduction threshold than extinguishing threshold, and a capacitor charging circuit connected in a closed series circuit with the second capacitor including, in series, said second capacitor, the direct current power source, and a sixth resistor, said direct current power source having a potential greater than the conduction threshold of the second gaseous discharge tube, the second oscillator having a resonant frequency lower than a sub-multiple of the frequency of the first oscillator when the first oscillator is inoperative and a frequency equal to said sub-multiple of the frequency of the first oscillator when the first oscillator is operative.

References Cited by the Examiner

UNITED STATES PATENTS

| | | | |
|---|---|---|---|
| 2,017,542 | 10/1935 | Langer | 331—55 X |
| 2,442,138 | 5/1948 | Mann et al. | 331—106 X |
| 2,476,415 | 4/1949 | Woodruff | 331—130 |
| 2,570,442 | 10/1951 | Grosdoff | 328—28 |
| 2,973,484 | 2/1961 | De Roy | 331—51 |

FOREIGN PATENTS

| | | |
|---|---|---|
| 393,865 | 6/1933 | Great Britain. |

ROY LAKE, *Primary Examiner.*

GEORGE N. WESTBY, JOHN KOMINSKI, *Examiners.*

J. B. MULLINS, *Assistant Examiner.*